Jan. 12, 1954                R. T. CLOUD                2,665,499
               PENDULUM AND ACCELERATION COMPENSATION APPARATUS
Filed April 3, 1948                                 2 Sheets-Sheet 1

Inventor
RAYMOND T. CLOUD

Jan. 12, 1954 R. T. CLOUD 2,665,499
PENDULUM AND ACCELERATION COMPENSATION APPARATUS
Filed April 3, 1948 2 Sheets-Sheet 2
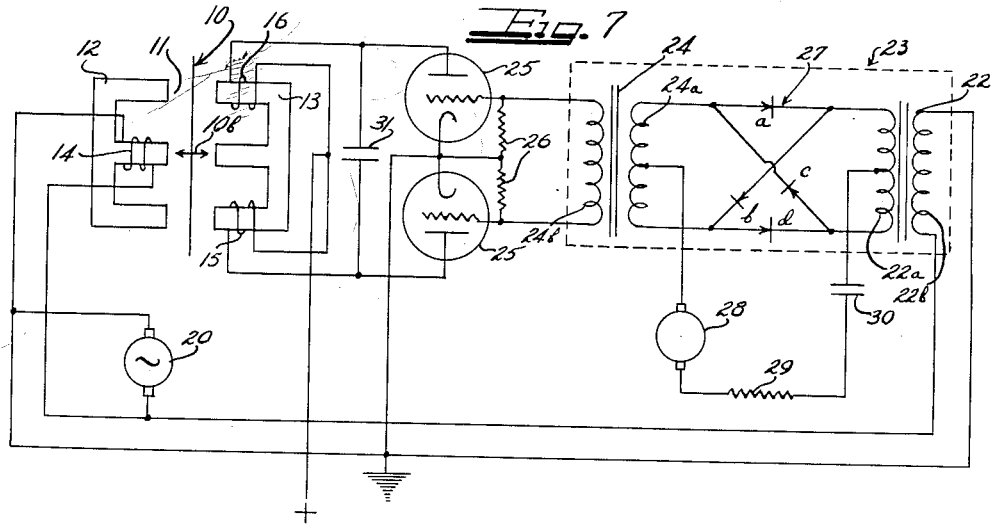
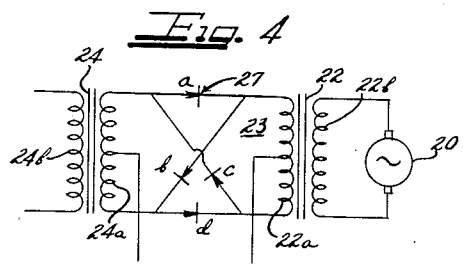
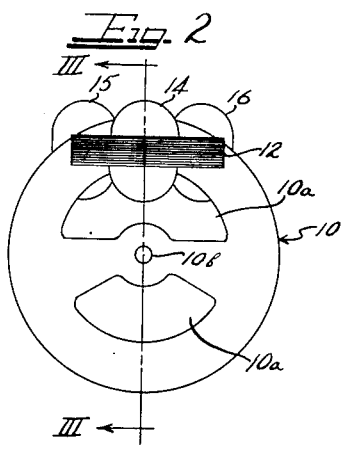
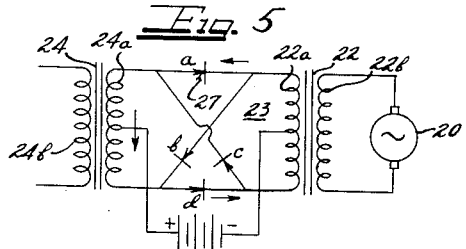
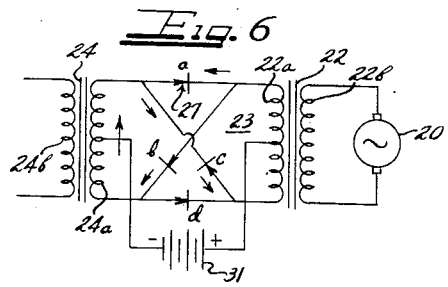
Inventor
RAYMOND T. CLOUD Patented Jan. 12, 1954

2,665,499

UNITED STATES PATENT OFFICE 2,665,499

PENDULUM AND ACCELERATION COMPENSATION APPARATUS

Raymond T. Cloud, Houston, Tex., assignor to North American Geophysical Co., Houston, Tex., a corporation of Texas Application April 3, 1948, Serial No. 18,775

10 Claims. (Cl. 33—220)

This invention relates to a measuring pendulum, and particularly to a pendulum of the type employed in vehicle carried integrating altitude meters, and to a novel apparatus for effecting the compensation of said pendulum against the effects of vehicle acceleration.

While not limited thereto, this invention finds particular applicability in mobile devices for measuring differences in altitude along a path traversed by the mobile device.

A variety of vehicle carried devices have heretofore been known for effecting the measurement of differences in altitude along a path traversed by the vehicle wherein the fundamental measuring unit of the device comprises a gravity actuated pendulum. Generally, such devices operate by providing an indication of an angular displacement of such pendulum from its gravitational neutral position relative to the vehicle while the vehicle traverses any desired path. The sine of such angular displacement is derived and integrated to obtain an indication of the differences in altitude or elevation of the device at any point along the path of the vehicle with respect to the starting point. Such devices have been of great value in seismic exploration, surveying and similar activities, inasmuch as the devices may be mounted on any mobile vehicle and will provide an accurate indication of relative altitude of any point along the vehicle path, irrespective of the deviations of the actual path traversed by the vehicle in arriving at such point. However, such known devices are subject to a serious disadvantage in that the acceleration or de-acceleration of the vehicle with respect to the ground surface will also produce a displacement of the pendulum and hence tend to introduce an erroneous factor into the altitude measurements effected by the device.

It has heretofore been proposed, for example, in my prior Patent No. 2,362,616, issued November 14, 1944, that the controlling pendulum be compensated to effectively neutralize the erroneous influences of vehicle acceleration. Devices heretofore employed required that a coil be mechanically connected to the shaft of the pendulum and a current supplied to such coil to cooperate with the magnetic fields produced by an adjacent magnet to produce a torque on the pendulum to exactly neutralize the vehicle acceleration forces experienced by the pendulum. Such compensation arrangements have not been entirely satisfactory due to the fact that the compensating coil required extremely accurate positioning with respect to the pendulum and that very light flexible electrical connections to the coil were required to avoid interference with gravitational displacements of the pendulum.

In accordance with this invention, a unique pendulum construction is provided, plus a novel apparatus for effecting the compensation of such pendulum against acceleration forces. In its broadest aspect, the compensating apparatus provided by this invention contemplates the mounting of at least a pair of coils independently of the pendulum but in inductive relationship to a metallic portion of the pendulum. Such coils are so arranged with respect to the pendulum and its path of gravitationally induced movements so that when energized by suitable currents, the coils produce flux penetrations of the metallic portion of the pendulum. The relative characteristics of such flux penetrations are controlled as a function of vehicle acceleration to produce a torque on the pendulum exactly equal and opposite to the acceleration induced torques thereon. In the case of D. C. energization of the coils, the relative characteristics controlled may be the magnitude and direction of the fluxes. In the case of A. C. energization, the relative characteristics may be the magnitude and phase of the two fluxes.

In those modifications of this invention wherein alternating currents are employed to produce the accelerating compensating effects upon the pendulum, this invention provides a novel means for producing compensating torque upon an electrically conducting portion of the pendulum through variation of the phase displacement of a control flux induced in the electrically conducting portion of the pendulum with respect to a biasing flux. In accordance with one modification of this invention, the control flux constitutes a differential flux produced by two coils connected in magnetic opposition. Circuit arrangements are provided for concurrently energizing the two coils with pulsating currents and for varying the relative magnitude of such pulsating currents as a function of the vehicle acceleration. As a result, the fluxes produced by the two coils are respectively in phase opposition. A reacting flux, or biasing flux, is then produced by energization of a suitable winding by a current which is in phase quadrature with respect to either of the two fluxes forming the control flux.

In accordance with a second modification of this invention, the biasing flux is produced by a winding connected directly to an alternating current source while the control flux is produced by a winding energized by the same alternating current source through a modulating circuit which not only effects a shift in phase of the control flux of approximately 90° with respect to the biasing flux, but selectively effects such phase shift in either a leading or lagging direction with respect to the biasing flux as a function of a signal voltage which, in turn, is a function of the vehicle acceleration. In either of the two modifications of this invention, the windings producing the control flux are so arranged with respect to each other and to the winding producing the biasing flux that the stray field effects produced by the energization of the biasing winding are cancelled out and neutralized in the control windings. In this manner, the accuracy of response of the pendulum system is greatly improved.

Still another means employing unidirectional fluxes to produce acceleration compensating torques on a pendulum is described and claimed in my copending application, Serial No. 18,776, filed concurrently herewith.

Accordingly, it is an object of this invention to provide an improved pendulum, particularly a pendulum for use in vehicle carried apparatus for continuously indicating the inclination of the path traversed by the vehicle with respect to the horizontal.

Another object of this invention is to provide an improved apparatus for automatically effecting the compensation of a freely suspended, vehicle carried pendulum against forces produced by acceleration of the vehicle.

A particular object of this invention is to provide an improved arrangement for compensating a vehicle carried pendulum against the effects of vehicle acceleration which does not require the mounting of any additional elements on the pendulum but it involves merely a location of current carrying coils in inductive relationship with respect to a metallic portion of the pendulum, and the energization of such coils so as to produce torsional forces on the pendulum which will exactly oppose any acceleration induced forces thereon.

Still another object of this invention is to provide an improved means for compensating a vehicle carried pendulum against forces induced by acceleration of the vehicle through the production of two fluxes linking the pendulum and controlling the relative characteristics of the two fluxes as a function of the vehicle acceleration to produce torsional forces on the pendulum which will exactly oppose any acceleration induced forces thereon.

A further object of this invention is to provide an improved means for acceleration compensation of a vehicle carried pendulum by the use of alternating currents which comprises the production of a biasing alternating magnetic flux in the metallic portion of the pendulum, the concurrent production of a control alternating magnetic flux in the same portion of the pendulum, and the varying of the phase of the control flux with respect to the biasing flux as a function of the vehicle acceleration to produce a resultant torque upon the pendulum which will be exactly equal and opposite to acceleration induced forces thereon.

Still another object of this invention is to provide an acceleration compensating circuit for a vehicle carried pendulum characterized by the utilization of alternating current for the development of acceleration compensating torque on the pendulum and the control of such alterating current through a modulating circuit, by a direct current whose magnitude and direction are functions of the vehicle acceleration.

The specific nature of this invention, as well as other objects and advantages thereof will become apparent to those skilled in the art from the following detailed description of the annexed sheets of drawings which, by way of preferred example only, illustrate one specific embodiment of the invention.

On the drawings:

Figure 2 is an elevational view of an exemplary form of pendulum construction embodying this invention showing the relationship of the pendulum disk with respect to the magnetic structures and energizing coils;

Figure 1:
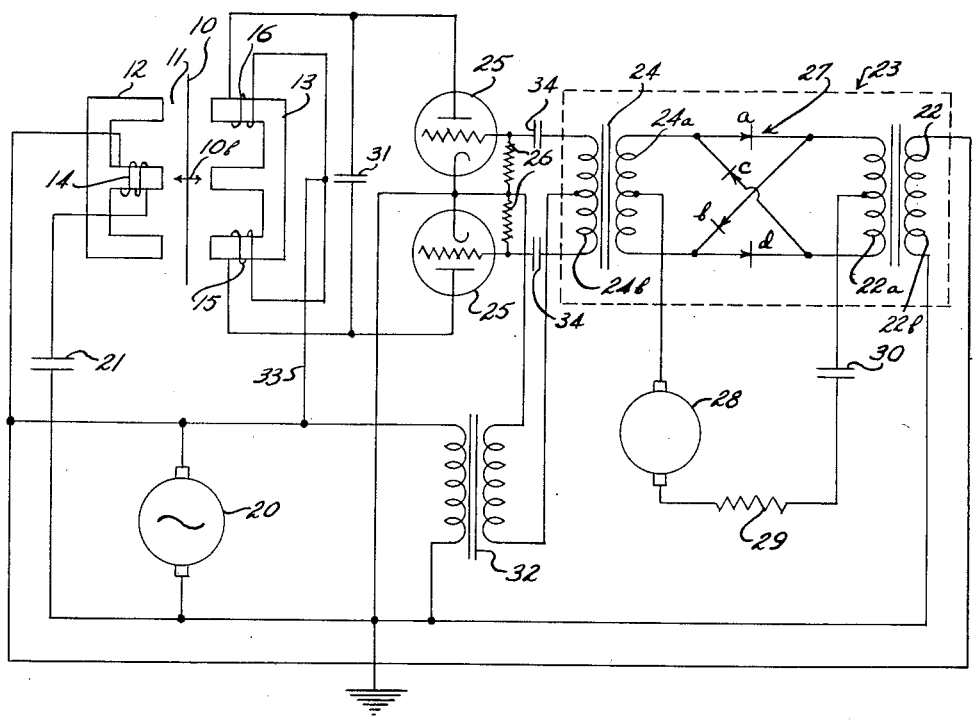
Figure 1 is a schematic view of a measuring pendulum embodying this invention together with a diagram of a circuit arrangement employed for effecting the acceleration compensation of such pendulum in accordance with the means of this invention.

Figures 4 through 6 are respectively schematic circuit diagrams illustrating the operation of the modulating circuit incorporated in the circuit of Figure 1 under various conditions of the controlling voltage; and Figure 7 is a schematic view of a measuring pendulum embodying this invention together with a diagram of a circuit arrangement employed for effecting the acceleration compensation of such pendulum in accordance with a modification of this invention.

As shown on the drawings:

As was heretofore indicated, the means of acceleration compensation of a vehicle carried pendulum embodying this invention contemplates the disposition of at least a pair of coils in inductive relationship to a metallic portion of the pendulum. The pendulum may comprise a disk-like member 10 of electrically conducting material having pivot mountings 10b at its center for freely suspending the pendulum in a suitable pair of bearings (not shown). The pendulum disk 10 is suitably weighted, as by having non-uniform apertures 10a formed therein so as to achieve pendulum characteristics and tend to assume a fixed angular relationship with respect to gravitational forces. A portion of the periphery of pendulum disk 10 passes through an air gap 11 defined between a pair of identical magnetic structures 12 and 13. Magnetic structures 12 and 13 are preferably supported independently of the pendulum disk 10 and respectively mount a biasing flux coil 14 and control flux coils 15 and 16. As will be brought out later, a resultant control flux is produced by the windings 15 and 16 in out of phase relationship with respect to the biasing flux produced by the winding 14, and hence a torque may be exerted on the pendulum disk 10 through the reaction of the eddy currents generated in the conducting disk.

In another example of the application of the means described and claimed in my copending application Serial No. 18,776, filed concurrently herewith, the portion of the pendulum disposed within the influence of the two control coils is formed of magnetic material and the control torques exerted on the pendulum by the control coils therefore constitute direct magnetic forces rather than eddy current reaction forces. In both cases, however, the same general method of acceleration compensation is followed. The relative characteristics of the two fluxes interlinking the pendulum, for example the relative direction and magnitude of the two fluxes, are controlled as a function of the acceleration of the vehicle on which the pendulum is carried.

In the compensating system illustrated in Figure 1, the control coils 15 and 16 are oppositely wound with respect to the magnetic structure 13 so as to tend to produce opposing magnetic fields in the air gap 11. The coils 15 and 16 are then concurrently energized by pulsating currents derived through tubes 25 from an alternating current generator 20 while the biasing coil 14 is energized from alternating current generator 20 through a series connected condenser 21 which has the effect of shifting the phase of the current flowing through the biasing coil 14 approximately 90° with respect to the current flowing in either the coil 15 or 16. As a result, the flux produced by the biasing coil 14 is substantially in phase quadrature with the fluxes respectively produced by the control coils 15 and 16, which fluxes, as heretofore indicated, are in phase opposition.

Hence, those skilled in the art will recognize that the arrangement and energization of the coils 14, 15 and 16 with respect to the pendulum disk 10 constitutes, in effect, a two phase eddy current motor and that the torque exerted upon the pendulum disk 10 will therefore depend upon the relative energization of the coils 15 and 16, there being no torque exerted when these coils are energized so as to produce equal magnetic effects in the air gap 11, and a resultant torque in one direction or the other being produced when the magnetic field effects produced by the coil 15 exceeds that produced by the coil 16, or vice versa.

Figure 3:
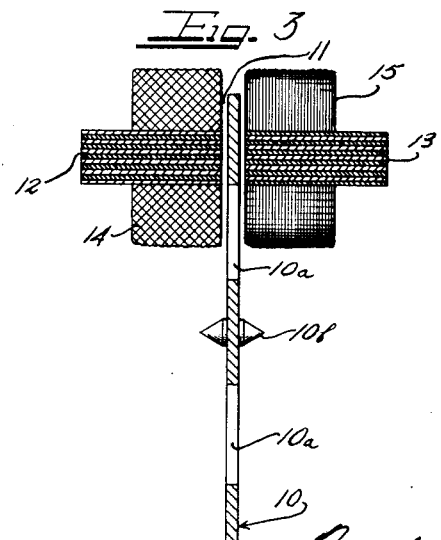
Figure 3 is an enlarged scale, sectional view taken on the plane III—III of Figure 2.

Accordingly, the assemblage of the magnetic structures 12 and 13 with respect to the pendulum disk 10 may closely resemble the physical construction commonly employed in eddy current motors. Of course, due to the necessary weighted characteristics of the pendulum disk 10, the construction will not be a true motor but rather will take the form of a torque motor. As is best shown in Figures 2 and 3, each of the magnetic structures 12 and 13 constitutes a stack of generally E-shaped magnetic laminations which are mounted in perpendicular relationship to a peripheral portion of the electrically conducting pendulum disk 10. The coil 14 may be conveniently wound about the center leg of the E-shaped magnetic structure 12 while the coils 15 and 16 may be respectively mounted around the end legs of the E-shaped magnetic structure 13. As a practical matter, all three of the coils could be mounted on a single one of the magnetic structures and the other magnetic structure be employed merely as a return magnetic path for the fluxes generated by the coils. In such case, the other magnetic structure may take the more simplified form of a plate or bar of magnetic material disposed on the opposite side of the pendulum disk 10.

As heretofore indicated, any suitable source of alternating current power may be utilized, such as the generator 20. The control coils 15 and 16 are energized in parallel from the generator 20 through conductor 33 and are respectively connected in series with the plate-cathode circuits of a pair of amplifier tubes 25. The grids of amplifier tube 25 are energized in parallel by alternating current of equal frequency to that produced by generator 20, such as through a transformer 32 which has its primary connected across the output terminals of generator 20 and the secondary terminals connected respectively between the grounded cathodes of amplifier tubes 25 and the center tap of a secondary winding 24b of an output transformer 24 of a phase reversing modulating circuit 23.

The modulating circuit 23, as will be described in more detail later, functions to produce an alternating current voltage whose magnitude and phase is dependent upon the direction and magnitude of a control voltage applied thereto. In this case, the control voltage employed is a function of the vehicle acceleration. The output voltage of the modulator circuit 23, represented by the voltage across the output transformer 24 is applied in push-pull relationship to the grids of amplifying tubes 25 through phase shifting condensers 34. The usual grid resistors 26 are connected between each of the grids of tubes 25 and the cathode. A condenser 31 is connected across the plate of the amplifying tube 25 and is suitably proportioned so as to tune the output circuit of the tubes 25, which includes the control coils 15 and 16, to substantial resonance at the frequency of generator 20. With the described circuit, and assuming that no output voltage is produced by the modulator circuit 23, each of the coils 15 and 16 will be energized by pulsating currents. As is well known, such current pulsations will essentially constitute alternating current waves by the fact that the coils 15 and 16 are resonant with condenser 31. The magnitudes of such currents are, of course, dependent upon the value of the alternating bias applied to the grids of the tubes 25 by the transformer 32. However, any variations in this alternating biasing voltage affects the magnitude of the current pulsations flowing in control coils 15 and 16 equally. Since the coils 15 and 16 are oppositely wound with respect to the magnetic structure 13, the fluxes produced by these coils will effectively cancel in the air gap 11 when the pulsating currents are of equal magnitude, and hence no resultant flux will be produced to interact with the phase displaced biasing flux produced by the biasing coil 14. However, when a voltage appears across the output terminals of the modulator circuit 23, depending upon the phase of such voltage, the effective grid bias of one of the tubes 25 over the conducting half of its cycle will be increased while the effective grid bias of the other tube 25 over the conducting portion of its cycle will be decreased. Thus, the current flowing in the control coils 15 and 16 will be differentially modified as a function of the magnitude and phase of the output voltage of the modulator circuit 23. Hence a resultant control flux will be produced in the air gap 11 which will react with the biasing flux produced by the coil 14 and a torque will be produced on the pendulum disk 10 whose direction and magnitude will be a function of the phase and magnitude of the output voltage of the modulator circuit 23. The modulator circuit 23 is controlled as a function of vehicle acceleration and the circuit constants are so arranged that the resultant torques produced on the pendulum disk 10 will be exactly equal and opposite to the acceleration induced torques thereon and the pendulum disk 10 will remain stationary during acceleration or deacceleration of the vehicle. As used herein, the term acceleration is employed generically to indicate either an increase or decrease in speed of the vehicle carrying the pendulum.

Having in mind the function of the modulating circuit 23, the construction thereof will now be described in detail. The modulating circuit 23 comprises an input transformer 22 having a primary winding 22b connected across generator 20 and a center tapped secondary 22a, a bridge arrangement of rectifying units 27, and an output transformer 24 having a center tapped primary 24a and a center tapped secondary 24b. The desired control voltage is connected between the center taps respectively of secondary winding 22a and primary winding 24a. Since it is desired to effect a control of the modulating circuit as a function of the vehicle acceleration, the control voltage may be derived from a D. C. generator 28 which is driven in any suitable manner at a speed proportional to the velocity of the vehicle, such as by the ground engaging wheel (not shown), and has connected in series therewith a resistance 29 and condenser 30 which effects differentiation of the voltage generated by the generator 28 in a well known manner. Thus the voltage applied across the center taps of windings 22a and 24a is an accurate function, both in magnitude and direction, of the vehicle acceleration. If desired, a modulating control voltage may be employed which is a function of only the horizontal component of vehicle acceleration by utilizing the circuit arrangements described and claimed in my copending application Serial No. 18,776, filed concurrently herewith.

In any event, the aforedescribed circuit will result in an output voltage being developed in the secondary winding 24b of output transformer 24 only upon the occurrence of changes in the vehicle velocity, and the magnitude and phase of such output voltage will be a direct function of the direction and magnitude of the vehicle acceleration. It is of course to be understood that the term acceleration is herein used in its generic sense and includes both positive and negative changes in vehicle velocity.

The operation of the modulating circuit 23 may be more clearly understood by reference to the schematic circuit diagram of Figures 4 through 6 wherein the modulating circuit 23 is represented under various conditions of operation. A unidirectional device, such as the rectifier units 27, ordinarily only conducts one-half wave of an alternating current. However, when the alternating current is superimposed upon a direct current, and the polarity of the direct current corresponds to the direction to which the rectifier is conductive, then both half waves of the alternating current will be transmitted by the rectifier so long as the magnitude of the negative peaks of the alternating current does not exceed the D. C. biasing voltage. In other words, the combination of the direct current and the alternating current becomes a pulsating direct current which can be transmitted by the rectifier. On the other hand, when the direct current bias is in such a manner as to oppose the flow of current in the conductive direction of the rectifier, no current can flow through the rectifier until the magnitude of the positive peak of the alternating current voltage exceeds the negative direct current bias on the rectifier.

In Figure 4, the equivalent circuit diagram of the modulator circuit 23 is illustrated during constant speed operation of the vehicle. Under such conditions, there is no effective modulating voltage applied to the modulating circuit 23. It is therefore apparent that an alternating current is imposed upon the rectifier bridge circuit from the secondary 22a of the input transformer 22, but no D. C. bias of any sort is imposed upon the rectifier bridge. Under this condition, it can be readily seen that there is a path for both negative and positive paths of the alternating current wave through the rectifier bridge which effectively short circuits or avoids the traverse of the primary winding of transformer 24; producing to all intents and purposes, a short circuit between input transformer 22 and output transformer 24 so that no voltage is developed across the secondary winding 24b of output transformer 24.

Now let it be assumed that the rectifier bridge 27 is biased by means of a battery 31 connected as indicated in Figure 5 respectively between the two center tap points of secondary winding 22a of input current transformer 22 and primary winding 24a of output transformer 24. This bias renders the rectifiers $a$ and $d$ conductive to alternating current so long as the magnitude of the negative peaks of such alternating current does not exceed the bias potential of the battery. At the same time, the bias provided by the battery 31 blocks rectifiers $b$ and $c$ and hence prevents transmission of any portion of applied alternating voltage having peak values less than the bias of the battery 31. Therefore, the path of the pulsating current waves through the modulating circuit is as indicated by the arrows in the diagram of Figure 5 and an output voltage will be developed across the secondary winding 24b of output transformer 24.

Assume now that the polarity of the battery 31 is reversed as illustrated in Figure 6. The rectifiers $a$ and $d$ are then blocked while rectifiers $b$ and $c$ are biased so as to permit the conduction of alternating current having a peak value less than the magnitude of the bias of the battery. This again permits a current flow to occur in the primary winding of output transformer 24, but, due to the cross over arrangement of rectifiers $b$ and $c$, the phase of the output voltage developed in the secondary of output transformer 24 is exactly reversed from the phase of the output of the same transformer under the condition shown by Figure 5.

It happens that the described modulator circuit inherently effects a phase shift of 90° of its A. C. output voltage relative to the A. C. input, in addition to the phase reversing action accomplished as a function of the D. C. control voltage. Hence it is desirable to include the phase shifting condensers 34 in its output circuit to eliminate such 90° shift and thus improve the effectiveness of the grid bias on tubes 25 in differentially modifying the energization of coils 15 and 16.

Referring back to Figure 1, it is therefore obvious that when the vehicle carrying the apparatus is increasing in speed, the voltage output from D. C. generator 28 will be increasing and current will be flowing into the condenser 30 which biases the rectifier bridge 27 in one direction. Conversely, a decrease in speed of the vehicle results in a lower voltage of the generator and current will flow from the condenser 30 to bias the rectifier bridge 27 in an opposite direction. Hence the phase of the voltage appearing across the secondary winding 24b of output transformer 24 will be shifted 180°, or reversed, according to whether the vehicle is increasing or decreasing its speed, and the magnitude of such voltage will be a direct function of the magnitude of the vehicle acceleration. The torque effects of the control coils 15 and 16 upon the pendulum disk 10 are so proportioned that the forces of acceleration on the pendulum disk 10 are exactly neutralized, so that the pendulum preserves a normal vertical position during the periods of a vehicle acceleration or deacceleration.

Of course, the pendulum disk 10 is entirely free to respond to gravitational forces and to tend to shift its relative position with respect to its support structure as in the inclination of the vehicle changes with respect to the horizontal. Such gravitational shifting of the pendulum 10 may be detected in any convenient manner, such as by the photo-electric apparatus described and claimed in my copending application Serial No. 769,017, filed August 16, 1947, and the tendency of the pendulum to shift in response to such gravitational effects may be employed as a primary control signal for actuating an integrating type elevation meter, or similar apparatus.

In Figure 7, a modification of this invention is disclosed wherein a similar type of pendulum and compensating system is employed, but which system operates according to a somewhat different principle, but nevertheless generically related to the method of operation of the circuit of Figure 1 heretofore described. In the arrangement of Figure 7, wherein similar reference numerals refer to identical elements of the previously described figures, it will be noted that the pendulum construction is identical to that heretofore described. However, the biasing coil 14 is now connected directly across the terminals of alternating current generator 20. As a further distinction, the control coils 15 and 16 are now connected in push-pull relationship with respect to the plate circuit of amplifying tubes 25 and a common D. C. plate supply is provided for the amplifying tubes 25. The input voltage for the tubes 25 is derived solely from the output of the modulator circuit 23.

The control voltage for the modulator circuit 23 is again derived as a function of vehicle acceleration through the wheel driven D. C. generator 28 and the series connected condenser 30.

Since the control coils 15 and 16 are again connected in magnetic opposition with respect to the magnetic structure 13, it follows that the push-pull connection of the control coils 15 and 16 with respect to the amplifying tubes 25 will result in the fluxes respectively produced by coils 15 and 16 operating in additive relationship. Hence, so far as producing the necessary torque effect upon the pendulum disk 10 is concerned, the coils 15 and 16 effectively constitute a single coil producing a control flux whose magnitude and phase is dependent upon the output of the modulator circuit 23. It is not necessary to employ a condenser in series with the biasing coil 14 so as to produce the necessary 90° phase shift of the biasing flux with respect to the control flux. Such condenser may be eliminated in this modification by virtue of the fact that, as mentioned above, the modulating circuit 23 automatically functions to produce a quadrature phase shift of its output with respect to the phase of the alternating current supply to its input. In other words, the phase of the output voltage in the modulator circuit 23 appearing across the secondary winding 24b will be either 90° ahead or 90° lagging with respect to the phase of the alternating current generator 20 dependent upon whether the vehicle is increasing or decreasing its speed. Under either condition, the flux produced by the control coils 15 and 16 will be substantially 90° displaced with respect to the biasing flux produced by the coil 14, and a resultant torque will be produced upon the pendulum disk 10 in the proper direction and of the proper magnitude to exactly neutralize the effects of acceleration induced forces thereon.

It should be noted that in both modifications heretofore described, a pair of oppositely wound coils are employed to produce the control flux. Such arrangement has the definite advantage in that stray field effects, or transformer actions, resulting from the energization of the coil 14 will be exactly neutralized and cancelled out in the series connected coils 15 and 16. Such arrangement insures that the pendulum will not be subjected to any spurious torques resulting from transformer coupling between the coil 14 and the coils 15 and 16.

From the foregoing description, it is apparent that the pendulum construction embodying this invention has the advantages of unusual simplicity and ruggedness of its components without in any manner sacrificing the accuracy of its indications. Further, the apparatus herein disclosed for compensating the pendulum against the effects of vehicle acceleration forces will reliably and accurately effect such compensation, even under highly transient conditions, and have the distinct advantage that compensation is effected without in any manner complicating the construction or operation of the pendulum itself.

It will, of course, be understood that various details of construction or procedure may be modified through a wide range without departing from the principles of this invention, and it is, therefore, not the purpose to limit the patent granted hereon otherwise than necessitated by the scope of the appended claims.

I claim as my invention:

1. In a ground vehicle carried altimeter, the improvement of a disc-type pendulum having at least a portion thereof formed of electrically conducting material, at least three coils closely spaced to said pendulum and arranged to be inductively associated with said conducting portion of said pendulum, means for energizing one of said coils by alternating current, means for energizing the other two of said coils respectively by alternating currents in opposite phase relation to each other and phase shifted from the alternating current flow in said one coil, whereby the relative energization of said two coils determines the direction of resultant torque on said pendulum, means for generating a signal which is a function of the translatory vehicle acceleration, and means for varying the relative energization of said two coils as a function of said signal, thereby neutralizing the translatory acceleration forces on said pendulum whereby said pendulum will be displaced in response to gravitationally induced accelerations only.

2. In a vehicle carried altitude measuring device, a pendulum having an electrically conductive portion, a pair of coils inductively associated with said electrically conductive portions of said pendulum, means for energizing said coils so that the magnetic fields respectively produced exert substantially equal and opposite effects in said pendulum in its gravitationally neutral position, means for generating an electric signal proportional to vehicle acceleration, and means for modifying the relative energization of said coils in response to said signal, thereby exerting a torque on said pendulum to neutralize any vehicle acceleration force thereon.

3. In a vehicle carried altitude measuring device, a pendulum disk of electrically conducting material, a pair of coils inductively associated with said disk, alternating current means for energizing said coils to respectively produce reversed phase flux penetrations of said pendulum disk, a third coil inductively associated with said pendulum disk, means for energizing said third coil to produce an alternating flux phase displaced from each of said reversed phase fluxes, whereby the relative energization of said pair of coils determines the magnitude and direction of resultant torque produced on said pendulum disk, means for generating an electrical signal proportional to vehicle acceleration, and means for modifying the relative energization of said pair of coils in response to said signal, thereby exerting a torque on said pendulum to neutralize any vehicle acceleration forces thereon.

4. In a vehicle carried altitude measuring device, a pendulum disk of electrically conducting material, an alternating current generator, a pair of coils inductively associated with said pendulum disk, means including a modulating circuit for respectively energizing said coils from said generator in opposed phase relationship, a third coil inductively associated with said pendulum disk, means for energizing said third coil from said generator in phase shifted relationship with respect to the energizing currents of each of said pair of coils, whereby the relative energization of said pair of coils determines the direction of eddy current reaction force exerted on said pendulum disk, means for generating a voltage proportional to vehicle acceleration, and means for applying said last mentioned voltage to said modulating circuit to control the relative energization of said pair of coils, whereby acceleration induced torques on said pendulum disk may be neutralized.

5. In a vehicle carried altitude measuring device, a pendulum disk of electrically conducting material, an alternating current generator, a pair of coils inductively associated with said pendulum disk, means including a modulating circuit for respectively energizing said coils from said generator in opposed phase relationship, a third coil inductively associated with said pendulum disk, means for energizing said third coil from said generator in phase shifted relationship with respect to the energizing currents of each of said pair of coils, whereby the relative energization of said pair of coils determines the direction of eddy current reaction force exerted on said pendulum disk, means for generating a direct current signal voltage proportional in magnitude and direction to vehicle acceleration, and means for applying said direct current signal voltage to said modulator circuit to control the relative energization of said pair of coils, whereby acceleration induced torques on said pendulum disk may be neutralized.

6. In a vehicle carried altitude measuring device, a magnetic structure defining an air gap and including a pendulum disk of electrically conducting material having a peripheral portion thereof movable through said air gap, a pair of coils respectively inductively associated with said magnetic structures and arranged to produce fluxes traversing said air gap, alternating current means for energizing said pair of coils to respectively produce reverse phase flux penetrations of said pendulum disk, a third coil inductively associated with said magnetic structure, means for energizing said third coil to produce an alternating flux traversing said air gap and phase displaced from each of said reversed phase fluxes, whereby the relative energization of said pair of coils determines the direction and magnitude of eddy current reaction torque on said pendulum disk, means for generating an electrical signal proportional to vehicle acceleration, and means for modifying the relative energization of said pair of coils in response to said signal, thereby exerting a torque on said pendulum to neutralize any vehicle acceleration forces thereon.

7. In a vehicle carried measuring device comprising a pendulum having a portion thereof formed of electrically conducting material, at least three coils inductively associated with said conducting portion of said pendulum, means for energizing one of said coils by alternating current to produce a biasing flux flow in said electrically conducting portion, means connecting said other two coils in magnetic opposition, means for energizing said other two coils respectively in push-pull relation by an alternating current to produce a control flux flow in said electrically conducting portion, and means for shifting the phase of said control flux relative to said biasing flux as a function of the vehicle acceleration, thereby producing torques on said pendulum equal and opposite to acceleration induced forces thereon.

8. A vehicle carried measuring device comprising an electrically conducting pendulum, said pendulum defining a weighted, substantially circular, pivoted disk adapted to respond to gravitational forces, a pair of coils inductively associated with said pendulum, means for energizing one of said coils to produce a first alternating magnetic flux penetrating said pendulum, means for energizing the other of said coils to produce a second alternating magnetic flux penetrating said pendulum, and means responsive to vehicle acceleration for controlling the magnitude and phase of said second flux relative to said first flux to produce reaction torques on said pendulum equal and opposite to acceleration induced torques thereon.

9. In a vehicle carried measuring device comprising an electrically conducting pendulum, a pair of coils inductively associated with said pendulum, means for energizing one of said coils to produce a first alternating magnetic flux penetrating said pendulum, means including a phase reversing modulator circuit for energizing the other of said coils to produce a second alternating magnetic flux penetrating said pendulum, means for generating a signal voltage having characteristics proportional to the magnitude and direction of vehicle acceleration, and means for applying said signal voltage to said modulator circuit to control the magnitude and phase of said second flux relative to said first flux to produce reaction torques on said pendulum equal and opposite to acceleration induced torques thereon.

10. A pendulum compensating arrangement for use in a ground vehicle altimeter, comprising, a disk type pendulum pivotally supported for pendulus movement about an axis above its center of gravity and having at least a portion thereof made of electrically conductive material, electrical circuit means including electrical excitation poles adjacent said pendulum to flow flux into the electrically conductive portions of the pendulum for inducing a compensatory torque directly in the pendulum itself, and control means for said circuit means regulating the excitation of said poles to change the flux flow in response to variations in transitory vehicle acceleration for continuously inducing a compensatory torque directly in the pendulum itself equal and opposite to any vehicle acceleration induced torque acting on said pendulum.

RAYMOND T. CLOUD.

References Cited in the file of this patent

UNITED STATES PATENTS

| Number | Name | Date |
|---|---|---|
| 681,835 | Soldana | Sept. 3, 1901 |
| 1,533,723 | Brown | Apr. 14, 1925 |
| 1,655,604 | Harris | Jan. 10, 1928 |
| 1,667,638 | Rex | Apr. 24, 1928 |
| 2,006,785 | Baughman | July 2, 1935 |
| 2,109,283 | Boykow | Feb. 22, 1938 |
| 2,113,226 | Young | Apr. 5, 1938 |
| 2,229,645 | Esval | Jan. 28, 1941 |
| 2,270,876 | Esval | Jan. 27, 1942 |
| 2,281,954 | Rinia | May 5, 1942 |
| 2,300,742 | Harrison et al. | Nov. 3, 1942 |
| 2,351,079 | Strobel | June 13, 1944 |
| 2,362,616 | Cloud | Nov. 14, 1944 |
| 2,419,063 | Fischer | Apr. 15, 1947 |
| 2,474,549 | Schoeppel | June 28, 1949 |

OTHER REFERENCES

Ser. No. 381,604, Lauck (A. P. C.), published May 4, 1943.